United States Patent [19]
Thomsen

[11] Patent Number: 5,460,013
[45] Date of Patent: Oct. 24, 1995

[54] REFRIGERATED SHIPPING CONTAINER

[76] Inventor: Van E. Thomsen, 108 Spring Pl., Enumclaw, Wash. 98022-8434

[21] Appl. No.: 298,060

[22] Filed: Aug. 30, 1994

Related U.S. Application Data

[63] Continuation-in-part of Ser. No. 163,920, Dec. 7, 1993, abandoned, which is a continuation-in-part of Ser. No. 42,891, Mar. 24, 1993, abandoned, which is a continuation of Ser. No. 800,881, Nov. 27, 1991, abandoned, which is a continuation-in-part of Ser. No. 593,771, Oct. 5, 1990, abandoned.

[51] Int. Cl.$^6$ .................................................. F25D 3/12
[52] U.S. Cl. ............................................ 62/239; 62/388
[58] Field of Search ............................. 62/239, 384, 388

[56] References Cited

U.S. PATENT DOCUMENTS

| | | | |
|---|---|---|---|
| 3,464,222 | 9/1969 | Gramse | 62/45 |
| 3,561,226 | 2/1971 | Rubin | 62/66 |
| 4,502,293 | 3/1985 | Franklin, Jr. | 62/388 |
| 4,593,536 | 6/1986 | Fink et al. | 62/239 |
| 4,704,876 | 11/1987 | Hill | 62/388 |
| 4,761,969 | 8/1988 | Moe | 62/388 |
| 4,951,479 | 8/1990 | Araquistain et al. | 62/239 |

*Primary Examiner*—William E. Tapolcai
*Attorney, Agent, or Firm*—Jensen & Puntigam

[57] ABSTRACT

A refrigerated, thin-walled shipping container (8) including a horizontal dividing element (20) forming a compartment (22) for holding $CO_2$ snow created by passing liquid $CO_2$ through manifold (24) along at least one side of the compartment and spraying the $CO_2$ snow against the opposite wall. The charging of the cooling compartment generates gas pressure, and the combination design of the charging manifold and pressure release vents allows the operation to be performed without excessive structural damaging pressure buildup.

6 Claims, 7 Drawing Sheets

REFRIGERATED SHIPPING CONTAINER

This application is a continuation-in-part application of U.S. patent application Ser. No. 08/163,920 filed Dec. 7, 1993, which is a continuation-in-part application of Ser. No. 08/042,891 filed Mar. 24, 1993, which is a file wrapper continuation application of a continuation-in-part application, Ser. No. 800,881, filed Nov. 27, 1991 from original U.S. patent application Ser. No. 593,771, filed Oct. 5, 1990, all abandoned.

TECHNICAL FIELD

This invention is directed to refrigerated shipping containers and, more particularly, to a lightweight, thin-skinned container which is capable of maintaining frozen products in a frozen state for several days through the use of carbon dioxide snow and includes a particular apparatus and method for charging the container with carbon dioxide snow without blocking the vents and thus letting the flash gas escape.

BACKGROUND ART

Carbon dioxide is utilized as a refrigerant in this invention rather than other cryogenic products such as nitrogen or oxygen because, unlike other cryogenic products that exist in only two states, liquid and gaseous, carbon dioxide exists in three forms—liquid, solid and gas. In the solid state, carbon dioxide can be fixedly located or contained to give the cooling effect required. It would be virtually impossible to contain cryogenic products in either liquid or gaseous states in a transportation vehicle.

A study conducted by the American Frozen Food Institute to find an alternative to mechanical methods of refrigeration which require extensive maintenance and labor intensive monitorings concluded that cryogenics, and especially carbon dioxide, would be a suitable alternative. The Institute created the first prototype railcar utilizing a series of $CO_2$ tanks placed beneath the floor of the railcar. The carbon dioxide was piped to each end of the railcar and connected to two orifices at each end wall near the ceiling. It was theorized that with the addition of temperature-sensing devices contained within the product environment, injection nozzles triggered by the rising temperature of the product contained therein would be activated and the carbon dioxide in the solid form (snow) would be sprayed upon the product. Because of the direct contact of the $CO^2$ snow to the product, the temperatures were not uniform and the products that directly contacted the solid $CO^2$ had a very low temperature and thus certain products would become very brittle. There was also the problem of freezer burn.

In order to keep the solid carbon dioxide from coming into contact with the products contained within the shipping enclosure, the design disclosed in Fink et al, U.S. Pat. No. 4,593,536, was developed. This patent utilizes a compartment along the top region of the railcar where the carbon dioxide is deposited in the solid form (snow) and held in reserve. The compartment is able to hold enough of the solid carbon dioxide to last many days. It was therefore possible to charge the car with the amount of snow at the loading location to complete a trip without needing an additional charge, eliminating the need to carry an additional supply of liquid carbon dioxide in the railcar. Sublimation vents were provided along one side wall adjacent to the liquid manifold to allow the sublimation gasses to enter the compartment below to provide the required refrigeration. These vents in the bunker compartment also provide a pressure relief for the flash gasses which are created in the transition from liquid to snow. The cold sublimated gasses theoretically would flow out of these vents, down the side wall in fluted panels that were provided, across the floor and upwardly in the flutes of the opposite side wall. Because carbon dioxide is heavier than air, the cold gasses did not effectively flow up the opposite side wall, but instead exited down the floor areas to the vents that carried the gasses to the outside, this uneven flow left areas in the compartment not effectively cooled.

A design disclosed by Hill, U.S. Pat. No. 4,704,874, theorized that by having a center discharge manifold and providing sublimation openings in the bunker along both side walls and along the end walls, the sublimated gasses would completely envelope the product. The flow of these sublimated gasses down all walls was then channeled along the floor of the compartment. These channels were created by aluminum T-beams running the length of the rail car which then collected the cold gasses and routed it to a discharge duct to the exterior of the railcar.

Because of a basic knowledge that certain perishable products could not be allowed to be contacted by carbon dioxide vapors, and especially those products that require oxygen to exist, an alteration to the previous designs was suggested by Moe, U.S. Pat. No. 4,761,969. Moe disclosed a design that was able to operate in a plurality of modes for this purpose. This design was to create the carbon dioxide snow and store it in a flexible bladder located in the bunker compartment. The gasses produced were to be released through a bladder vent and therefore keeping these vapors channeled through the container, not coming in contact with the inner loaded compartment, therefore acting in a manner such as an ice bag. This design has yet to be produced and it is doubtful that any material which could be made into a bladder would be able to withstand the very low temperature of solid carbon dioxide.

Thomsen, U.S. Pat. No. 4,891,954, was designed to alleviate the problems that have plagued all previous approaches and to control the tremendous pressures that are created in the loading process whereby liquid carbon dioxide is being forced through a small orifice to create the solid form (snow). The pressure at which liquid carbon dioxide exists in a standard storage vessel and is subsequently transported into the manifold of the storage compartment is approximately 300 p.s.i.g. For each 100 pounds of liquid carbon dioxide that is transformed from a liquid into a solid, only 46.5% becomes the solid and the remainder becomes flash gas. It is this flash gas at the extremely high pressure that is generated during the loading cycle that must be able to exit the bunker compartment, to eliminate the possibility of exploding the bunker or destroying the integrity in the metal in the roof of the vehicle. By creating additional relief ports directly below the center manifold, it was theorized that the snow would be blown toward each wall, therefore allowing at area below the manifold to relive this flash gas pressure.

This design certainly did seem to alleviate the previous problems encountered in the design of the railcars because of their integral strength, but utilizing this same procedure in the manufacture of shipping containers failed drastically. The present invention is directed toward the alleviation of the problems of the flash gas build-up associated with all the previous inventions so that can be successfully utilized in not only railcars but also in ocean shipping containers and trailers.

DISCLOSURE OF THE INVENTION

In accordance with the present invention, a carbon dioxide cryogenic refrigeration material is utilized to maintain the required result in keeping the stored products adequately refrigerated. The present invention includes an insulated lightweight container, intermodal or trailer having a floor, a ceiling, side walls, end walls and loading doors. The side walls determine the length of the container and the end walls being the width. The loading doors could be located in either end wall, or in the side walls. A bunker is provided as a separation of the lower main storage area and the storage area for the snow formed from the cryogenic carbon dioxide. This bunker is a means of supporting the supply of snow and to provide release areas to relieve the sublimated gasses and the flash gas. A plurality of apertures extending through this bunker adjacent to the side walls permit the flow of sublimated gasses from the bunker area to the fluted side walls and also into channels in the floor of the bunker. Each bunker panel has at least one, and preferably two, apertures adjacent each side wall to release those sublimated gasses and flash gasses. These apertures are covered with ¼ inch stainless steel wire mesh.

In the previous designs that have all been constructed to be used with railcars, it has never been possible to see into the bunker area while charging the compartment with carbon dioxide, therefore it has not been possible to determine exactly the direction of flow or dispersement of the snow. The construction of intermodal containers, using the same center manifold as mentioned in the Hill, Moe, and the previous Thomsen patents, generated the same problems as existed with all previous units designed. The pressure created by the flash gas (up to 300 psi) tends to blow out the bunkers and/or seriously distort the metal in the roof. Even with the relief ports as mentioned in the Thomsen patent, the pressure created is not tolerable. With railcars being constructed with very heavy gauge materials, it is not as critical. However, the shipping containers and trailers are constructed with a maximum of 14-gauge material and thus are not able to withstand the pressure. The loading doors of a shipping container are located in the rear end wall, making it possible to remove an end bunker compartment and allow visual inspection of the charging procedure. It was determined that, with the center manifold having orifices on each side, the snow was directed to each side wall and the snow in combination with the pressure created by the flash gas completely clogged the apertures that were designed to relieve this pressure, including those center relief ports as described in the Thomsen patent. In order for gasses to penetrate the snow bank being formed above each relief aperture, the snow would have to have a consistency of no more than 30 pounds per cubic foot. The pressure generated by the flash gas, up to 300 psi, however, forced the snow to these points at substantially higher pressure than this and therefore restricted the access of the flash gasses, creating enough pressure to blow out the bunker and distort the metal roof.

The prior art cited herein are all well known to the present inventor and all disclose the system in conjunction with a railcar. With a railcar, weight is generally not a problem, and therefore reinforcing structure may be introduced. The average weight of a railcar is 1558 pounds per linear foot, whereas the average weight of an ISO container, those containers under consideration here, is 230 pounds per linear foot. The railcar is constructed of ½ inch steel framework to which is secured by welding and rivets 3/16 inch steel side walls and ¼ inch roofs and floors. The ISO container is fabricated of 1.4 mm aluminum secured to 4.0 mm aluminum framework by aluminum rivets. The utilization of the technology as taught by the prior art simply did not work and ended in structural failure.

As described in the present invention, the manifold with the orifices to discharge the snow is located adjacent to one side wall and directly above the apertures in the bunker. The orifices are therefore directed to the opposite side wall. The snow bank is created at the opposite side wall building backwards toward the manifold.

It is an object of the present invention to provide a manifold and discharge orifice combination for charging containers with $CO^2$ snow such that the snow free-falls and does not become compacted.

Another object of the present invention is to provide a bunker for supporting and storing $CO^2$ snow wherein the placement of the charging orifices, the vents and the discharge is such that complete charging and uniform distribution of the cold gas is readily achieved.

Yet another object of the present invention is to provide a shipping container wherein the snow supporting bunker is reinforced, greatly reducing the possibility of structural failure while segregating the snow storage space to improve the efficiency and reduce charging time.

Yet another object of the present invention is to provide a thin-skinned intermodal container such that, knowing the dimension of the container, the amount of insulation and by controlling the sublimation, the container can be charged in the correct amount of $CO^2$ snow to maintain the desired temperature for the duration of the trip.

Still a further object of the present invention is to provide a container for containing and shipping frozen goods wherein the desired temperature is maintained through the controlled sublimation of $CO^2$ snow.

BEST MODE FOR CARRYING OUT THE INVENTION

Figure 1:
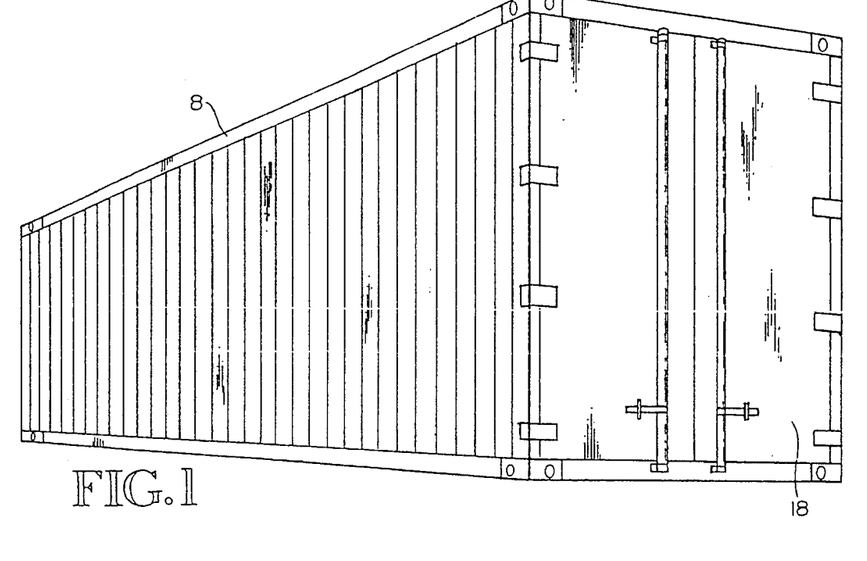
FIG. 1 is an isometric view of the exterior of a container such as contemplated in the present invention.

As seen in FIG. 1, an intermodal shipping container 8 is shown having a pair of front loading doors 18.

Figure 2:
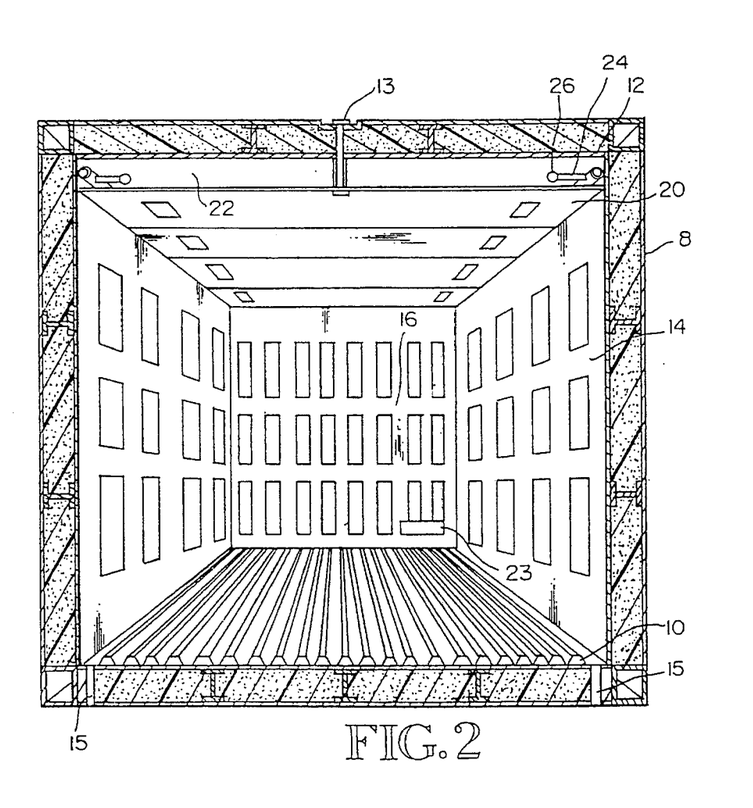
FIG. 2 is a vertical section through the end of a typical container.

Reference is now had to FIG. 2 which is a sectional view through the container of FIG. 1. As seen in this view, the container is fabricated of aluminum beams which support an aluminum floor and an outside layer of aluminum panels, preferably 1.4 millimeters in thickness and interior side walls which may be of fiberglass or stainless steel for sanitation reasons. The interior of the container 8 includes a fluted floor 10, preferably aluminum, fluted fiberglass side panels 14 and a fiberglass overhead bunker 20 forming a compartment 22 into which the $CO^2$ snow may be blown. The upper surface of bunker 20 will be faced with a reflective material. The snow is forced into the bunker by means of a manifold pipe 24 having a plurality of nozzle orifices 26 which direct the snow toward the opposite side of the bunker and slightly toward the ceiling. Also seen in this view are the end panels 16, flash gas relief vent 23 as explained hereinafter, and drain members 15.

Figure 3:
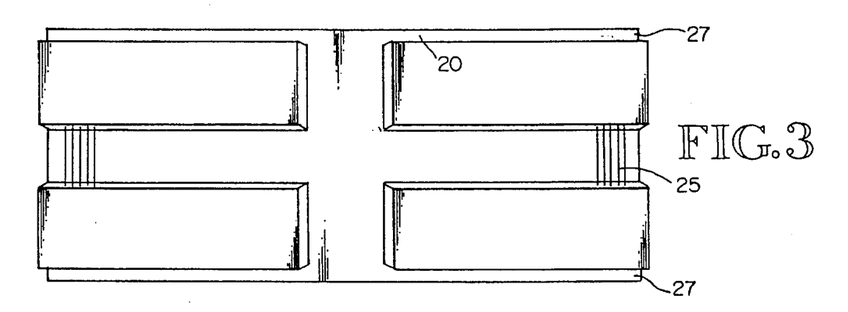
FIG. 3 is a plan view of a typical bunker section.
Figure 4:
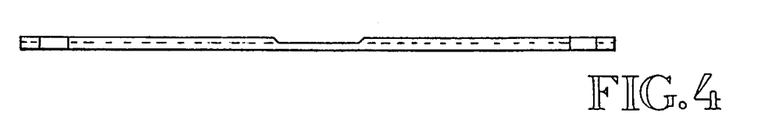
FIG. 4 is a vertical view of the bunker of FIG. 6.
Figures 5, 6:
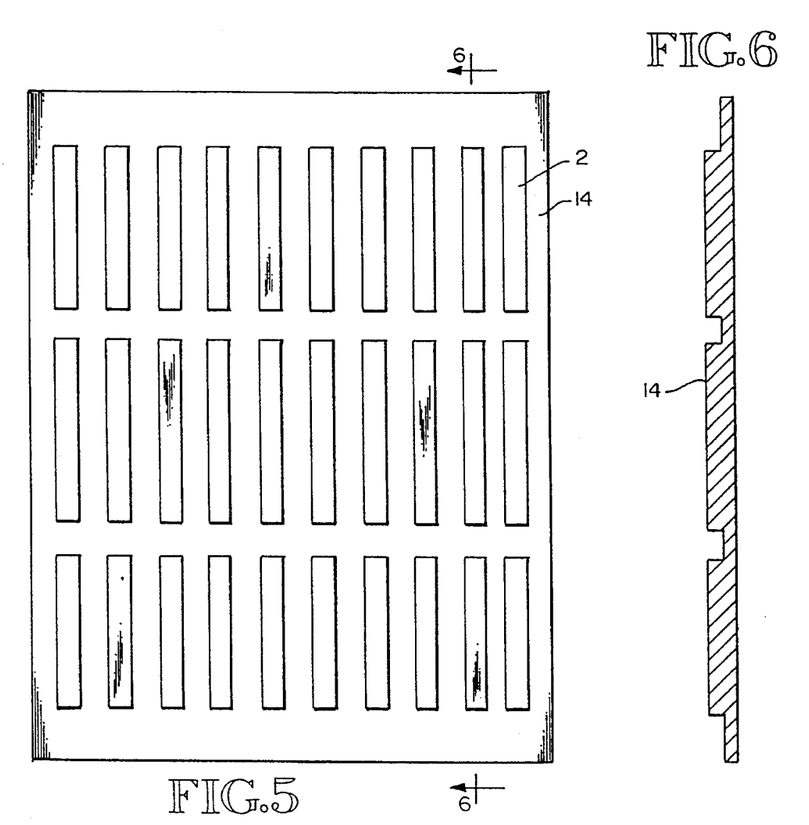
FIG. 5 is a vertical view of a typical wall.
FIG. 6 is a end view of the wall of FIG. 8.
Figure 7:
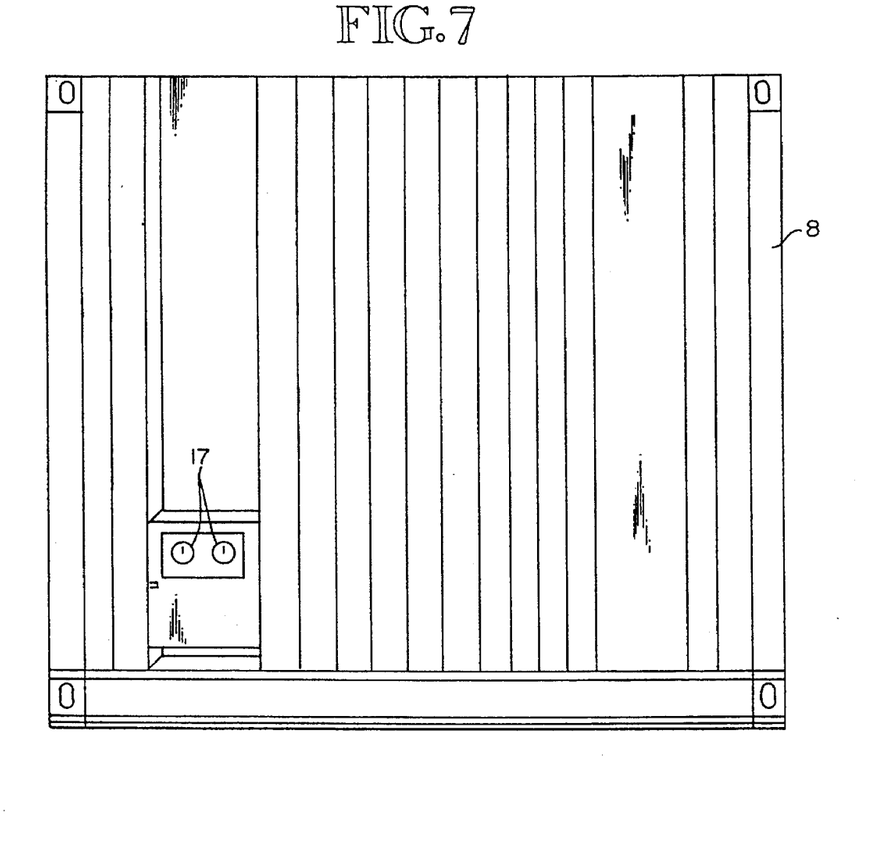
FIGS. 7, 8 and 9 depict a proposed venting system for a cargo container.

As seen in FIGS. 3 and 4, the fiberglass bunker 20 includes flanges 27 for resting on top of the walls 14 and also includes vents 25 to allow the cold air to move downwardly into the main compartment. Side wall 14, as seen in FIG. 5, likewise includes outwardly projecting elements 2 to hold the cargo somewhat spaced from the wall allowing circulation of the cold air between rectangular spaced elements 2.

Figure 8:
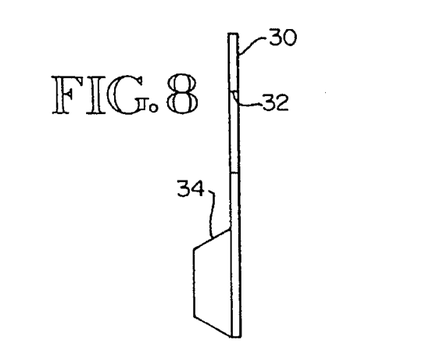
Figure 9:
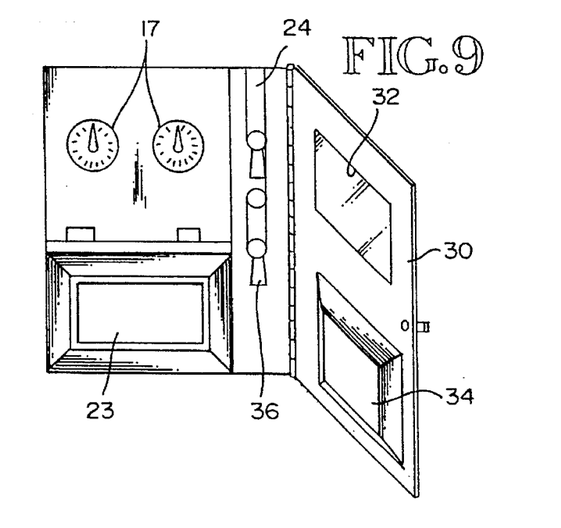

Because of the requirements of shipping containers, as set by the International Standards Organization (ISO), in that the containers be of prescribed dimensions, the vent, as seen as 23 in FIG. 1, is also depicted as 23 in FIG. 8, which includes the actual opening which is closed by door 30 having an opening so that gauges 17 may be viewed with the door closed. It is to be noted that the door 30 also includes a plug member 34 for filling the opening 23. In order to charge the container, the gaseous $CO^2$ is pumped into openings 36 and is carried by manifold 24 upwardly to be released as snow in the cargo compartment. As will be obvious, flash gas formed during the charging of the bunker will be able to escape through opening 23, but once the container is fully charged, then door 30 will be closed, sealing opening 23. It is to be noted later that one of the car remains vented.

Figure 10:
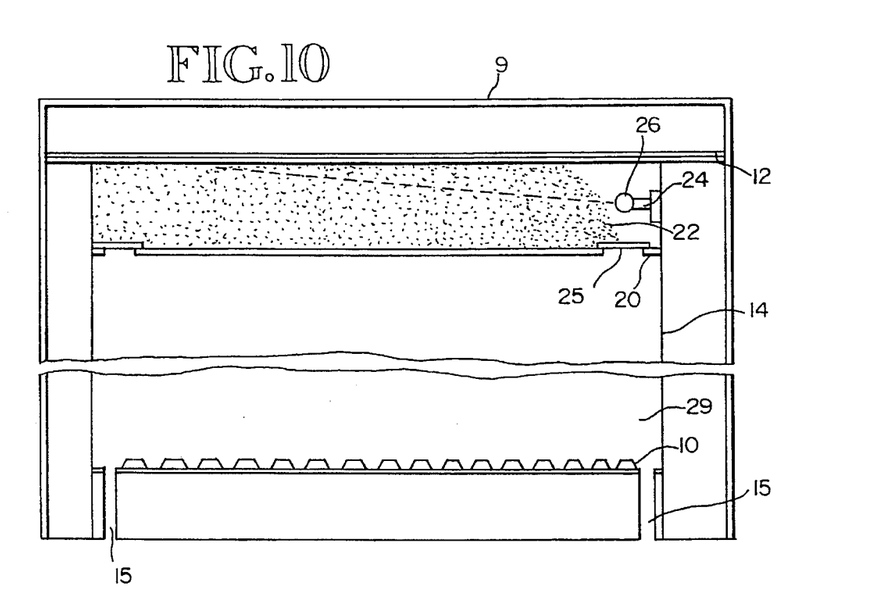
FIG. 10 is a vertical section through the container illustrating a charging and distribution system including a structure for segregating the snow-containing space and improving the structural integrity of the unit.

FIG. 10 depicts the way that the solid $CO^2$ snow would be formed in the space above the bunker 20, impinging against the far wall, forming a mound of snow which would then move backwardly toward the nozzle, keeping the vents 25 open for the maximum amount of time, preventing undue pressure and reducing, if not limiting the risk of damaging the container.

Figure 11:
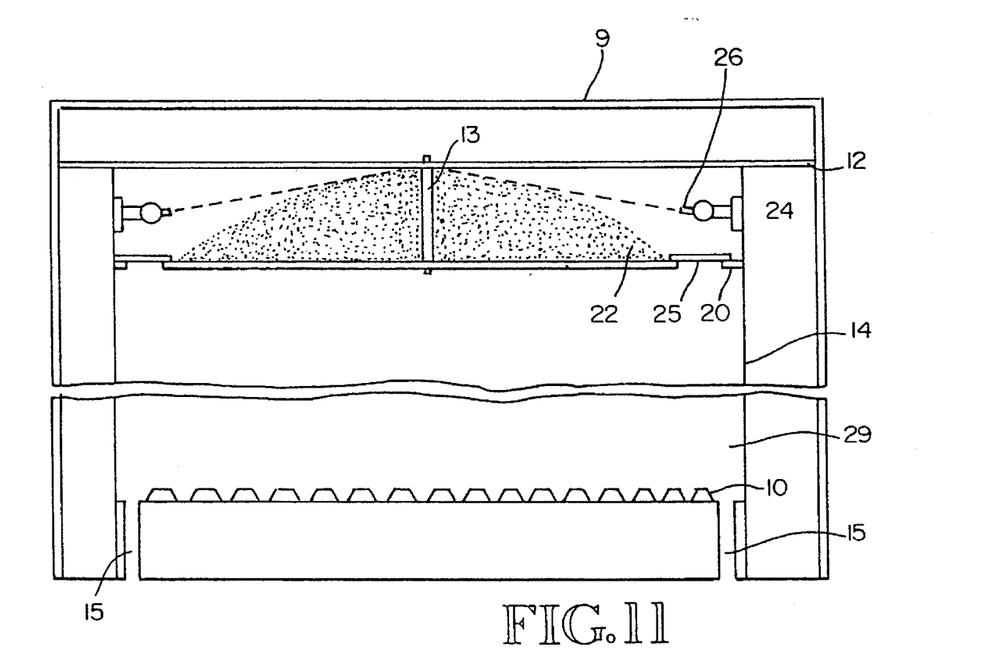
FIG. 11 is an alternative charging manifold configuration.

FIG. 11 shows an alternative method of charging the container wherein nozzles 26 cause the snow to impinge against divider 13 and then build backwardly toward the vents 25. Drains are shown at 15.

Figure 12:
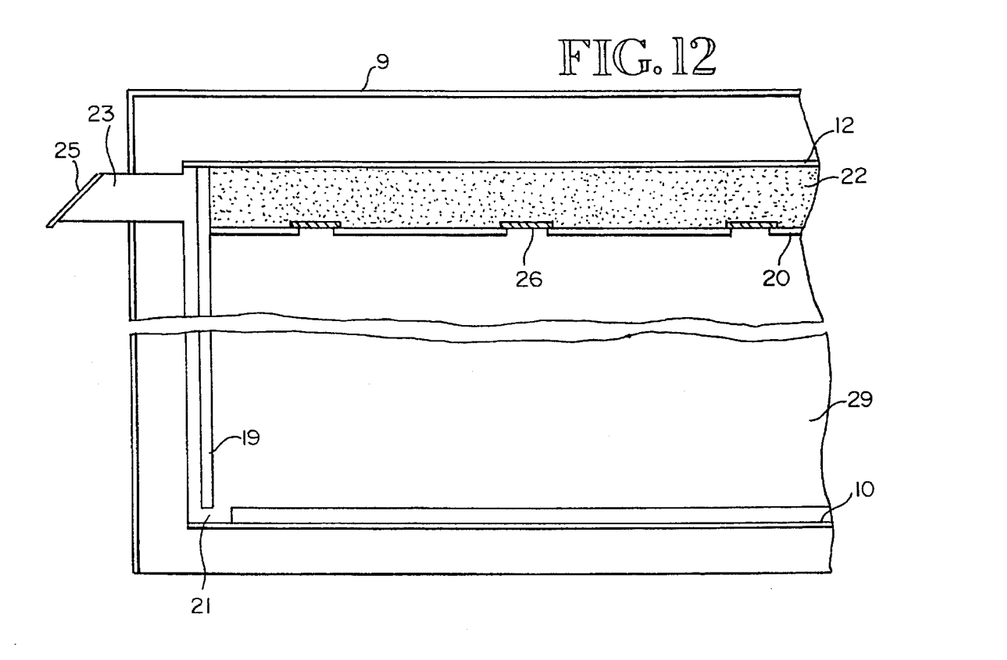
FIG. 12 is a vertical view disclosing the discharge plenum.

FIG. 12 depicts a vertical section along the longitudinal axis of the container showing an opening 21 at the bottom corner leading to a vertical cavity behind wall 19 wherein the gas to be discharged is collected and, when the pressure is great enough, discharges outwardly through conduit 23 closed by spring biased door 25.

Figures 13, 14:
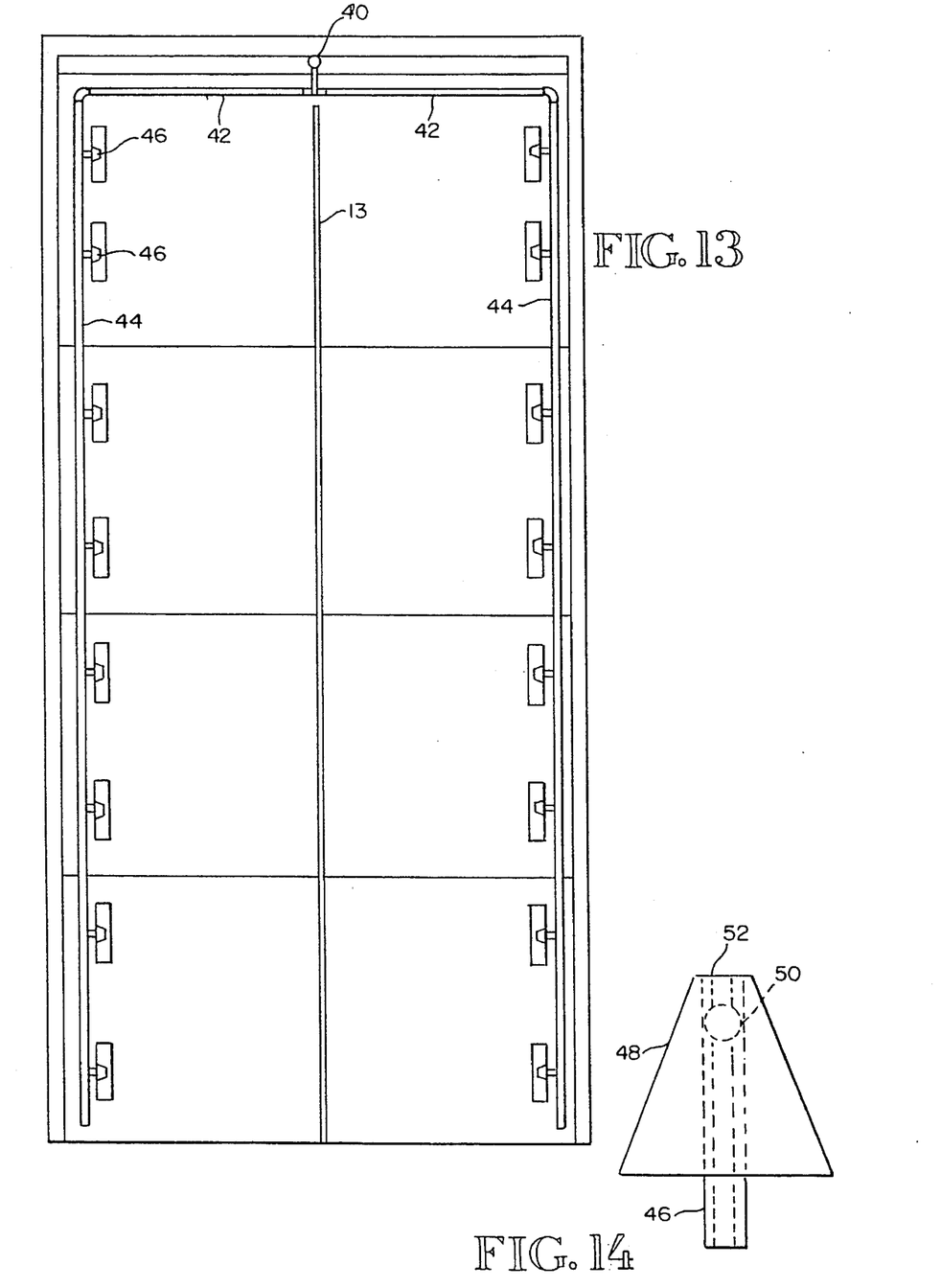
FIG. 13 is a plan view of the snow distributing system.
FIG. 14 is an enlarged view of a gas diffuser.

FIG. 13 depicts a plan view of the inventive container showing a vertical section of conduit 40 in communication with two horizontally placed, outwardly extending conduits 42, which in turn are connected with conduits 44 extending the length of the container.

A plurality of nozzles 46 are distributed along the length of the container which, as pointed out hereinabove, extend outwardly and upwardly, impinging the $CO^2$ snow against the barrier 13. As seen in this view and as seen more clearly in FIG. 14, the nozzles 46 include a gas diffuser 48 which is in the form of a truncated cone. The nozzle 46 has a vertical vent 50, allowing some of the flash gas to escape upwardly and be diffused rearwardly, whereas the $CO^2$ snow exits through the end of the nozzle as at 52 and is projected across the container to impinge against barrier 13.

Figure 15:
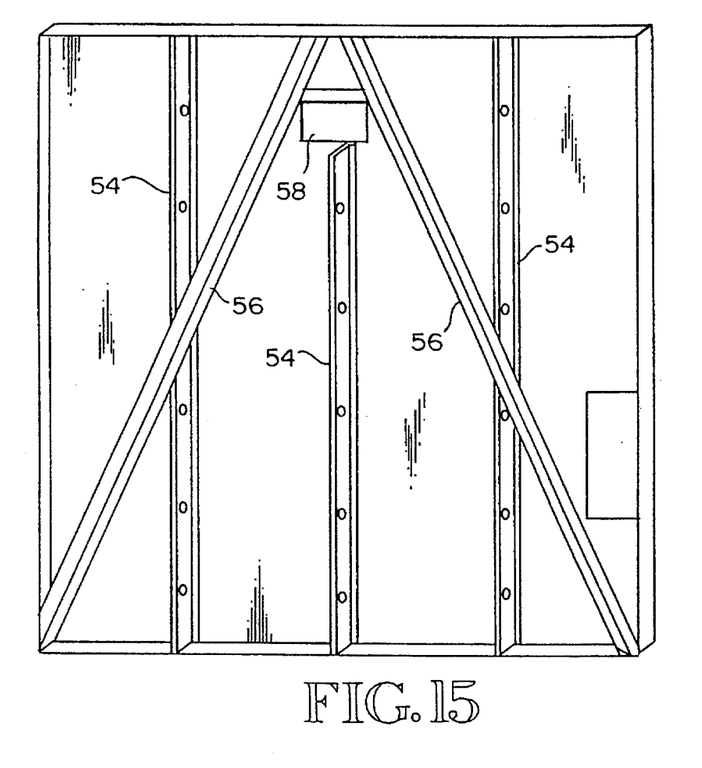
FIG. 15 is an alternative end wall configuration for use in the inventive container.

FIG. 15 depicts an alternative end wall system, including vertical support members 54 intersected by angle support members 56, which terminate adjacent the upper portion of the container, giving additional strength and reserving a place for the vent 58, which as explained hereinbefore and described in greater detail hereinafter, allows for the venting of gases during the sublimation and cooling of the product. The warm gases from the floor move up the interior side of the wall, and when the pressure is great enough to release the magnetic catch, exit to the atmosphere.

Figure 16:
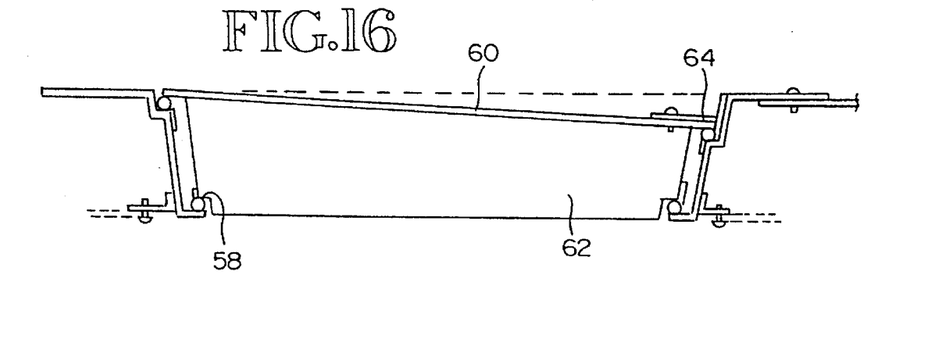
FIG. 16 is a vertical section through the vent structure.

As seen in FIG. 16, vent 58 is closed by a door 60 having insulation 62 and a hinge 64 at the upper portion thereof. In addition to the sealing gaskets, the lower portion of the door includes a magnetic strip interaction to keep it closed until sufficient internal pressure is reached.

I claim:

1. A lightweight intermodal container in the form of a rectangular hexahedron fabricated of lightweight aluminum framework covered by lightweight aluminum panels of 14 gauge or less, wherein said container utilizes $CO_2$ snow to maintain the desired temperature, said $CO_2$ snow maintained out of contact with the product contained in the container by a horizontal panel intermediate the bottom and the top of said container, said panel including a plurality of vents along one longitudinal edge of the horizontal panel, a plurality of nozzles selectively connected to a source of liquid $CO_2$ mounted above the vents, within the confines formed by the horizontal panel, the roof, side walls and ends of the container, said nozzles configured to convert the liquid $CO_2$ to $CO_2$ snow and directed upwardly and outwardly from the vents, such that it impinges upon an opposing wall, permitting the $CO_2$ gas generated to escape downwardly through the vents, preventing excessive pressure in the confines and precooling the container.

2. An intermodal container as in claim 1, wherein the empty weight of the container is less than 250 pounds per linear foot.

3. An intermodal container as in claim 1, wherein the walls and floor are irregular in configuration to permit free circulation of the chilled air.

4. An intermodal container as in claim 1, wherein a vertical panel extends longitudinally of the container between the horizontal panel and the roof of the container, and nozzles are located along each longitudinal edge of said panel.

5. An intermodal container as in claim 1, wherein a false wall is placed along one end of the container forming a plenum and a vent is located at the top of the plenum.

6. An intermodal container as in claim 5 whrein the vent is closed by a hinged cover urged toward the closed position such that a predetermined pressure is required to vent the gases to the outside controlling the flow.

* * * * *